(12) United States Patent
Raymond et al.

(10) Patent No.: US 7,153,555 B2
(45) Date of Patent: Dec. 26, 2006

(54) PLASTIC OBJECTS INCLUDING LENTICULAR LENS SHEETS

(75) Inventors: Mark A. Raymond, Littleton, CO (US); Bruce N. Thornbloom, Dublin, OH (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 09/566,063

(22) Filed: May 5, 2000

(65) Prior Publication Data

US 2004/0157011 A1 Aug. 12, 2004

(Under 37 CFR 1.47)

Related U.S. Application Data

(60) Provisional application No. 60/182,490, filed on Feb. 15, 2000.

(51) Int. Cl.
*B32B 1/02* (2006.01)

(52) U.S. Cl. .................... 428/34.1; 428/35.2; 428/34.9; 428/35.7; 428/306; 428/310; 428/359; 428/463

(58) Field of Classification Search ................ 428/35.2, 428/34.9, 35.7, 306, 310, 463; 359/463
See application file for complete search history.

(56) References Cited

U.S. PATENT DOCUMENTS

| 2,499,453 A | 3/1950 | Bonnet ........................ 359/625 |
| 2,650,181 A * | 8/1953 | Streed et al. ............ 428/317.3 |

(Continued)

FOREIGN PATENT DOCUMENTS

| EP | 0615827 A1 | 3/1994 |
| EP | 0812668 A1 | 12/1996 |
| EP | 0818708 A1 | 7/1997 |
| EP | 1014169 A1 | 12/1999 |
| JP | 1149175 * | 2/1999 |
| JP | 11049175 * | 2/1999 |
| WO | WO 99/41156 * | 8/1999 |
| WO | WO-01/96079 A2 | 12/2001 |
| WO | WO-02/051611 A1 | 7/2002 |

OTHER PUBLICATIONS

*Travel Tags, Inc.* v. *Digital Replay Inc.*, Civil Action No. 02–4726MJD/JGL in the U.S. District Court for the District of Minnesota (filed Dec. 3, 2002), Third Amended Complaint dated Jun. 28, 2004.

*Travel Tags, Inc.* v. *Digital Replay Inc.*, Civil Action No. 02–4726MJD/JGL in the District Court for the District of Minnesota (filed Dec. 3, 2002), Defendant Digital Replay, Inc's Answer to Plaintiff's Third Amended Complaint and Amended Counterclaim and Demand for Jury Trial dated Jul. 6, 2004.

*Travel Tags, Inc.* v. *Digital Replay, Inc.*, in Munich, Germany (filed Feb. 9, 2004), Complaint dated Feb. 9, 2004.

*National Graphics, Inc.* v. *Travel Tags, Inc.*, d/b/a Xtreme Graphics, Civil Action No. 04–C–0013 in the U.S. District Court for the Eastern District of Wisconsin (filed Jan. 7, 2004), Complaint dated Jan. 7, 2004.

*National Graphics, Inc.* v. *Travel Tags, Inc.*, d/b/a Xtreme Graphics, Civil Action No. 04–C–0013 in the U.S. District Court for the Eastern District of Wisconsin (filed Jan. 7, 2004), Second Amended Answer dated May 26, 2004.

U.S. Appl. No. 60/257,588.

*Primary Examiner*—Marc A. Patterson
(74) *Attorney, Agent, or Firm*—Patterson, Thuente, Skaar & Christensen, P.A.

(57) ABSTRACT

A product for displaying lenticular images, comprising: an insert including a lenticular lens material; a layer of ink; a thermal protective substrate layer; and a plastic base.

37 Claims, 5 Drawing Sheets

U.S. PATENT DOCUMENTS

| | | | | |
|---|---|---|---|---|
| 3,108,850 A | * | 10/1963 | Brandt | 264/509 |
| 3,119,195 A | | 1/1964 | Braunhut | 46/1 |
| 4,293,080 A | * | 10/1981 | Letica | 220/790 |
| 4,769,406 A | * | 9/1988 | Keithley | 524/100 |
| 5,003,915 A | | 4/1991 | D'Amoto et al. | 118/46 |
| 5,098,302 A | | 3/1992 | Sekiuchi | 434/426 |
| 5,100,717 A | | 3/1992 | Nedzu et al. | |
| 5,181,471 A | | 1/1993 | Sillars | 101/483 |
| 5,266,377 A | | 11/1993 | Kinoshita et al. | |
| 5,275,764 A | | 1/1994 | Hettinga | |
| 5,330,799 A | | 7/1994 | Sandor et al. | 427/510 |
| 5,457,515 A | | 10/1995 | Quadracci et al. | 355/132 |
| 5,488,451 A | | 1/1996 | Goggins | |
| 5,494,445 A | | 2/1996 | Sekiguchi et al. | 434/365 |
| 5,554,432 A | | 9/1996 | Sandor et al. | 428/157 |
| 5,560,799 A | | 10/1996 | Jacobsen | 156/277 |
| 5,617,178 A | | 4/1997 | Goggins | |
| 5,642,226 A | | 6/1997 | Rosenthal | 359/619 |
| 5,695,346 A | | 12/1997 | Sekiguchi et al. | 434/365 |
| 5,696,596 A | | 12/1997 | Taniguchi | 358/300 |
| 5,724,975 A | * | 3/1998 | Negus et al. | 600/450 |
| 5,753,344 A | | 5/1998 | Joacobsen | 428/142 |
| 5,762,379 A | * | 6/1998 | Salmon et al. | 283/91 |
| 5,812,152 A | | 9/1998 | Torigoe et al. | 347/2 |
| 5,847,808 A | | 12/1998 | Goggins | |
| 5,908,590 A | | 6/1999 | Yoshimi et al. | 264/45.4 |
| 5,924,870 A | | 7/1999 | Brosh et al. | 434/365 |
| 5,967,032 A | | 10/1999 | Bravenec et al. | |
| 6,001,208 A | | 12/1999 | Kinoshita et al. | |
| 6,016,225 A | | 1/2000 | Anderson | 359/619 |
| 6,060,003 A | | 5/2000 | Karszes | 264/1.34 |
| 6,073,854 A | | 6/2000 | Bravenec et al. | 235/487 |
| 6,133,928 A | | 10/2000 | Kayashima et al. | 347/171 |
| 6,144,496 A | | 11/2000 | Goto | 359/619 |
| 6,148,724 A | | 11/2000 | Hart et al. | 101/182 |
| 6,195,150 B1 | | 2/2001 | Silverbrook | 355/22 |
| 6,239,068 B1 | | 5/2001 | Tutt et al. | 503/201 |
| 6,256,150 B1 | | 7/2001 | Rosenthal | 359/619 |
| 6,307,675 B1 | | 10/2001 | Abe et al. | |
| 6,373,637 B1 | | 4/2002 | Gulick, Jr. et al. | 359/619 |
| 6,490,092 B1 | | 12/2002 | Goggins | |
| 6,490,093 B1 | | 12/2002 | Guest | 359/619 |
| 2002/0038917 A1 | | 4/2002 | McKee | 264/1.36 |
| 2002/0114080 A1 | | 8/2002 | Guest | |
| 2003/0121189 A1 | | 7/2003 | Williams | 40/324 |

* cited by examiner

PLASTIC OBJECTS INCLUDING LENTICULAR LENS SHEETS

CROSS-REFERENCE TO RELATED APPLICATIONS

This application refers to and specifically claims the benefit of U.S. Provisional Application No. 60/182,490, filed Feb. 15, 2000.

FIELD OF THE INVENTION

The present invention generally relates to the manufacture of plastic containers and objects, and more particularly, to a method of fabricating plastic objects having a lenticular lens sheet or insert. The fabrication method includes a process of bonding lenticular lens material to the constituent plastic of the container or object during molding processes without damaging the lenticular lens materials.

BACKGROUND OF THE INVENTION

Throughout the world, it is a common and growing practice to utilize conventional plastic molded cups and containers to display promotional messages and to increase the market value of the cups and containers by adding images of sports figures, movie and television personalities, and other graphics. While the printing processes for producing these messages, images, and graphics have improved in recent years with advances in printing technologies, the messages, characters, and other graphics have generally remained two dimensional, static and non-moveable. The expectations of purchasers of these containers continues to rise, and the general public continues to demand ever increasing and enhanced visual effects in all media. Specifically, the entertainment industry routinely licenses its proprietary images for use on cups, packaging, and containers of all types from plastic soda cups to popcorn containers and their lids.

The entertainment industry uses bright colors and molded shapes extensively to excite and interest consumers and collectors of these containers. There continues to be pressure from movie makers, sports promoters and others in the entertainment industry to develop new products to better capture the public's attention for their promotions and licensed products.

In addition to problems with creating more exciting imagery, there are design restraints faced by plastic cup and container manufacturers that must be addressed in creating any new product. For example, in the traditional plastic cup industry, the manufacturers are continuously struggling with the demands for a less expensive cup to make their use attractive as part of no-cost promotional campaigns (e.g., the cup is given away by a retailer with the purchase of soda, beer, or other beverage) and as a profitable standalone product. One method used to reduce cost is to reduce the amount or weight of plastic used in each cup by thinning the cup wall and other methods. Reducing the weight of plastic used reduces material costs and also makes the manufacturing (i.e., molding) of the cups faster and less expensive as the molds can be filled more rapidly and the plastic cools in a shorter time. However, the desired for less material weight and wall thickness must be balanced with the need for a cup with sufficient hoop strength. Hoop strength is a measure of the resistance of a cup to being squeezed shut or deformed. It is typically measured by adding weights or pressure to a point near the top of the cup on the outer surface of the side wall and measuring the amount of deflection of the open end of the cup.

To further minimize the costs of containers, the inner and outer surfaces of the walls are typically kept smooth and their shape kept relatively simple to minimize mold costs. These smooth surfaces also have been required because the typical method of plastic images and graphics on containers and other plastic objects is with standard printing processes, such as offset printing, that are most effective on smooth printing surfaces.

The inventors and others in the plastic cup and container manufacturing industry recognize the needs of the entertainment industry and understand the benefits of providing more visually appealing images and graphics as part of promotional cup or container and other plastic products. In this regard, the inventors and others in the industry believe that these plastic products will be significantly improved by including a three dimensional ("3D"), action image provided with the use of lenticular lens material or sheets (i.e., interlaced segments of images combined with lenticular lenses to provide a variety of visual effects such as motion, zooming in and out, and 3D effects). For example, a cup with Mark McGuire's 70$^{th}$ home run or a favorite scene from a recent Star Wars movie provided in dramatic 3D in a durable, reusable container is appealing and interesting to consumers and seen as a break through to the entertainment industry.

The use of lenticular lens material is known in the printing industry for use in creating promotional material and typically involves producing a sheet of lenticular lens material and adhesively attaching the lenticular lens material to a separately produced object for display. The production of lenticular lenses is well-known and described in detail in a number of U.S. patents, including U.S. Pat. No. 5,967,032 to Bravenec et al. In general, the production process includes selecting segments from visual images to create a desired visual effect and interlacing the segments (i.e., planning the layout of the numerous images), lenticular lenses are then mapped to the interlaced or planned segments, and the lenticular lenses are fabricated according to this mapping. The lenticular lenses generally include a transparent web which has a flat side or layer and a side with optical ridges and grooves formed by lenticules (i.e., convex lenses) arranged side-by-side with the lenticules or optical ridges extending parallel to each other the length of the transparent web. To provide the unique visual effects, ink is applied or printed directly to the flat side of the transparent web to form the interlaced segments and forming a thin, generally opaque ink layer in the produced lenticular lens material or sheet.

While these lenticular lens materials provide excellent visual effects, the use of adhesives and other attachment methods has not proven effective in producing a quality, long-lasting, and inexpensive plastic products. Because attaching the lenticular lens material after producing the plastic cup or container is inefficient and relatively expensive, the plastic manufacturing industry desires a method for attaching the lenticular lens material to a plastic cup or container as part of the cup or container manufacturing process. Unfortunately, the plastic manufacturing industry has not been able to overcome the problems associated with using common lenticular lens material as part of standard plastic fabrication processes. The problems arise because plastic fabrication generally includes processes such as injection molding that involve heating raw plastic materials to a relatively high temperature (e.g., 400° to 500° F. or hotter) and then injecting the fluid plastic into a mold with the shape of the desired plastic object or by otherwise processing the molten plastic. While the transparent web of the lenticular material may not be damaged by these high temperatures, the ink or ink layer has a chemistry that will not stay intact when the ink is heated to these high temperatures, and the image will be destroyed or at least significantly altered. Additionally, even if the ink could withstand the heat of plastic fabrication processes, the plastic manufacturing industry has not been able to engineer an inexpensive and efficient attachment process that effectively bonds the ink layer, and therefore, the lenticular lens material, to the plastic of the formed product.

Consequently, there remains a need for a method of fabricating plastic containers and other objects that includes lenticular lens material, and preferably, a fabrication method that overcomes the problem of bonding the lenticular lens material to plastic in a cost effective and structurally acceptable manner. Additionally, there remains needs for plastic objects with improved physical characteristics that can be manufactured inexpensively, such as a plastic cup with improved hoop strength and less plastic weight.

SUMMARY OF THE INVENTION

To address the above discussed design constraints and the needs of the plastic manufacturing and entertainment industries, the invention provides an efficient and economical method to produce plastic objects, such as containers, with lenticular material included as an integral insert. This method produces a unique plastic object with the features of 3D graphics and/or animated video clips showing a fraction of a second to up to several seconds when viewing the lenticular insert from the outer surface of the plastic object. The object resulting from the process is a durable, one piece unit with outstanding graphics such as animated video clips showing up to 3 to 5 seconds of live or computer generated graphics or the latest 3D technology. The lenticular insert that provides these unique visual imagery comprises generally lenticular material having optical ridges and grooves on an outer surface and a layer or transparent web of lenses, which together create a relatively rigid material with air passages or avoids. A layer is attached to the flat side of the transparent lens layer. The actual images are pre-printed in this ink layer on the back side or second surface of the pre-extruded or post-embossed plastic lens material which may be made of a variety of plastic materials including, but not limited to, amorphous polyethylene terephthalate (APET), flexible or rigid polyvinylchloride (PVC), styrene, and PETG (polyethylene terephthalate modified with cyclohexanedimethanol (CHDM)). The actual images are interlaced corresponding to the frequency of the lenticular lens material (i.e., the optical ridges and grooves and the transparent lens layer) and are then printed using offset lithography, web, letterpress, digital, screen, or any other printing process. One method of printing to achieve high quality is offset printing with ultraviolet (UV) cured inks.

According to one aspect of the invention, a plastic object is produced that provides several beneficial features or characteristics desired by the plastic manufacturing industry. For example, in one preferred embodiment, a container, such as a stadium-type cup, is provided with an outer wall that includes a lenticular insert. Preferably, the lenticular insert is an integral part of the outer wall and extends around the periphery of the wall to cover a significant portion of the outer wall surface area. Due to the air voids, the lenticular insert acts as a thermal barrier or an insulation layer that reduces heat transfer rates through the outer wall and makes the container more useful for hot and cold service. Additionally, the optical ridges of the lenticular insert cause the insert to function as an attached gripping surface by increasing the roughness of the outer wall (which in standard plastic containers is smooth). Because of the strength and rigidity of the lenticular insert, the outer wall of the container has high strength and specifically, has improved hoop strength. Additionally, the strength and rigidity of the lenticular insert allows material in the outer wall to be eliminated, thereby reducing the amount of raw plastic needed for forming the container. In the traditional cup business, the major manufacturers are continuously trying to remove weight from the product to reduce material costs and to make the molds cycle faster (e.g., weight reduction is one way to speed the cycle). Additionally, as will become clear from the discussion of the fabrication method of the invention, inserting the lenticular insert into the mold prior to injecting the molten plastic material allows the lenticular insert to act as a carrier and a stiffener for the molten material. This allows the manufacturer to open the mold faster to reduce cycle times and allows the wall thickness of the container to be reduced giving a reduced part weight. A prototype of a standard-sized, stadium cup fabricated by the inventors had approximately 53 grams in molded plastic content which is an improvement over the prior art and it is expected that a plastic content of about 30 grams or less will provide acceptable strength and durability. In other words, a container including the lenticular insert provides desirable strength characteristics with reduced container manufacturing times and molding-plastic material costs.

According to a related aspect of the invention, the container in a preferred embodiment includes a framing system to physically hold the lenticular insert against or within the outer wall of the container. As noted previously, the ink layer does not provide an effective bonding surface for bonding with molten plastic in container fabrication processes (but, as will become clear, in a preferred embodiment of the invention a protective substrate or laminate is applied to the ink layer to provide a bonding surface). The frame system provides one method of overcoming this problem by including upper, lower, and seam frame members that slightly overlap each of the edges of the lenticular insert (more frame members can be included if the lenticular insert has more than four sides). Preferably, the seam frame member fills a small gap left between the lenticular insert side edges and overlaps both side edges. This configuration of the seam member is preferred to improve the strength of the container because cracking may occur if the side edges were merely butted against each other. The frame members further function to protect exposed surfaces of the lenticular insert from scratching and other damage during handling and storage (such as stacking or nesting of containers or cups) by providing a slightly raised surface adjacent the exposed surface. The frame members are bonded to the outer wall of the container, and in this regard, a preferred method of forming the frame members is to configure the mold cavity for creating the frame members during the molding process which makes the frame members integral with the outer wall of the container.

According to another aspect of the invention, a fabrication method is provided that forms a plastic object, such as a container, with an integral lenticular insert that includes processes for protecting the ink lenticular insert. Typical plastic fabrication processes, such as injection molding and blow molding, involve the heating of the raw plastic or charge material to high temperatures to make the plastic fluid or moldable but without further processes, these high temperatures would also degrade or ruin the ink. In this regard, the fabrication method of the invention includes the step of applying and/or bonding a protective substrate to and over the ink layer of the lenticular insert prior to inserting the lenticular insert into the mold cavity for plastic molding of the plastic object. The substrate may be formed using numerous materials such as coating materials and many plastics. The substrate is preferably bonded to the ink in a manner that does not degrade the ink but yet achieves a bond that will withstand the temperatures and pressure experienced in the molding processes and, in some applications, in the later use of the container. Although adhesives may be used, one preferred embodiment involves a two step process in which a plastic hot melt or laminate is first applied to a carrier or liner sheet and then when cooled, the plastic, hot melt/laminate is activated by heat and pressure applied to achieve a bond to the ink layer. In this fashion, a much lower temperature (i.e., a temperature that does not degrade the ink layer) can be used to bond the laminate to the ink, as the laminate is not molten. The carrier is preferably a quick release liner that can be readily removed from the attached laminate and the laminate is exposed. The laminate acts as a thermally protective layer or substrate in later plastic molding processes such that the ink is not destroyed and a plastic object with a lenticular insert can be readily formed using standard plastic processing techniques.

According to a related aspect, the fabrication method of the invention includes providing a bonding surface on the lenticular insert that bonds with the molten plastic material used to form the plastic object. In a preferred embodiment, a plastic substrate is attached to the ink layer of the lenticular insert, and is a plastic selected, for example, from polypropylene, PVC, polyethylene, and polyester. The lenticular insert is then positioned within a mold cavity, such as the cavity of a mold used in an injection molding tool, with the substrate facing inward and being exposed. In an embodiment employing injection molding, the material charge is heated to melt the plastic and the hot melted plastic is injected into the mold cavity under pressure to fill the mold cavity. The molten plastic contacts the plastic substrate melting an outer portion of the substrate. The mold cavity and its contents are then cooled and the injected plastic and the melted portion of the substrate form a bonding interface which securely bonds the lenticular insert to the formed plastic object.

According to another related aspect, the fabrication method of the invention includes a position retention process for retaining the lenticular insert within the mold cavity during molding processes. For the lenticular insert to provide a desirable visual effect, it is important that molten plastic not seep onto the optical ridges and transparent lens layers of the lenticular insert. This seeping or bleeding can occur because the molten plastic is under high pressures and seeks any cavity and passageway within the mold, such as under the positioned lenticular insert. In one embodiment, the fabrication method includes the step of applying a strong suction or vacuum force to the lenticular insert to hold the optical ridges and transparent layers of the lenticular insert firmly against the outer walls of the mold cavity to prevent molten plastic from seeping onto the image portion of the lenticular insert. In another embodiment, the fabrication method includes the intermediary step of forming raised surfaces on the substrate of the lenticular insert prior to positioning the insert within the mold cavity. The raised surfaces allow molten plastic to flow onto the substrate for bonding but also abut a die or other surface within the mold cavity such that the raised surfaces push outward on the lenticular insert when the insert is positioned within the mold cavity and the cavity is closed. The raised surfaces may be a plastic or other material and preferably have a thickness approximately equal to the desired thickness of the outer wall adjacent the lenticular insert.

Other features and advantages of the invention, including alternative methods for providing a protective layer for the ink layer, for forcing the lenticular insert against the outer walls of the mold cavity, and for molding the container or other object from hot or liquid plastic, will be seen as the following description of particular embodiments of the invention progresses in conjunction with references to the drawings.

DESCRIPTION OF THE DRAWINGS

The accompanying drawings, which are incorporated in and form a part of the specification, illustrate preferred embodiments of the present invention, and together with the descriptions serve to explain the principles of the invention.

In the Drawings.

DETAILED DESCRIPTION OF THE INVENTION

With the above summary of the invention in mind, the following description discusses the inventive plastic objects according to the invention that have an integral image visible due to a lenticular insert that is uniquely included as an integral part of the plastic object. The discussion concentrates on the structural and other benefits and features of a container having a lenticular insert in an outer wall, but, it should be understood that many other objects will similarly benefit from the addition of a lenticular insert and are considered within the scope of the invention. From the discussion of features of a container fabricated according to the invention, the discussion proceeds to a full discussion of the method of fabricating plastic objects having a lenticular insert integrally bonded to the plastic that forms the body, walls, or some other portion of the object. Again, the discussion will specifically explain the steps in fabricating a container with a lenticular insert bonded to an outer wall. Of course, these same or similar steps within the breadth of the method of the invention can be employed to fabricate any number of other plastic objects having a lenticular insert.

Figure 1:
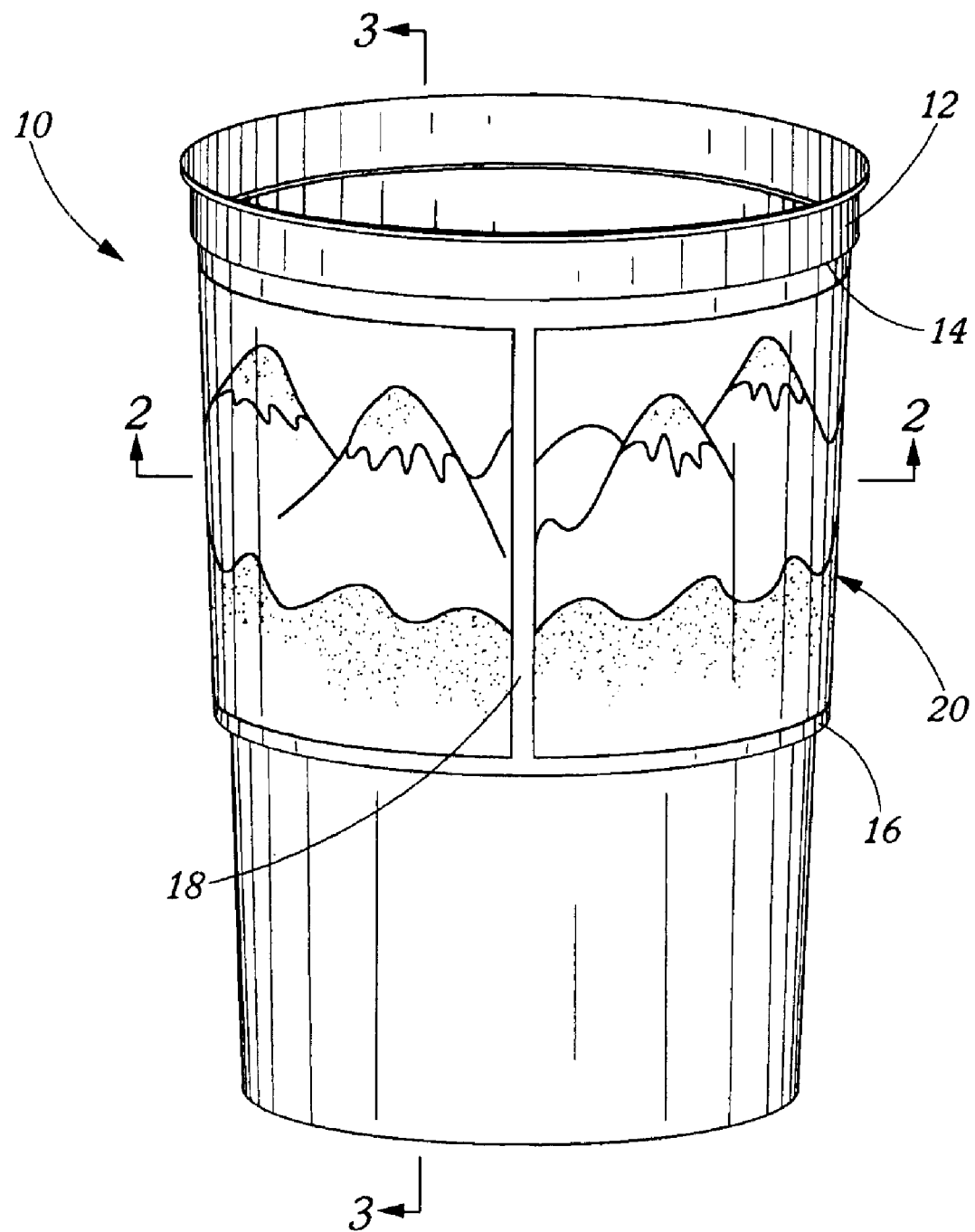
FIG. 1 is a perspective view of a plastic, molded cup with a lenticular lens insert bonded to the outer wall according to one preferred method of the present invention.
Figure 2:
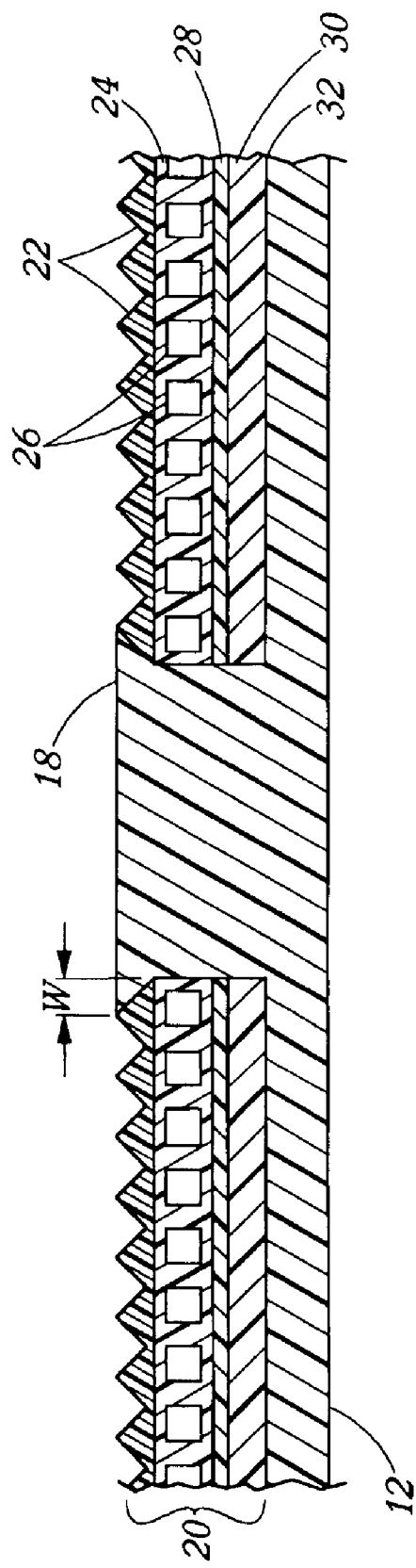
FIG. 2 is an enlarged, partial sectional view of the cup of FIG. 1 taken along line 2—2 illustrating the layers of the lenticular insert including a bonding and thermal protection layer according to the invention and illustrating the framing feature of the present invention at the seam of the lenticular insert.
Figure 3:
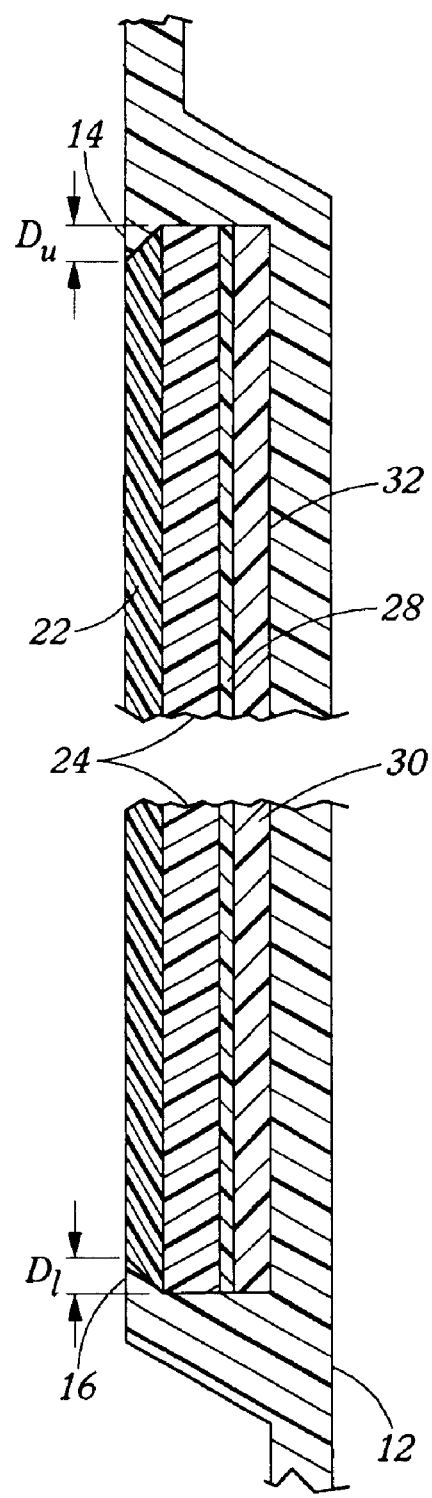
FIG. 3 is an enlarged, partial sectional view of the cup of FIG. 1 taken along line 3—3 illustrating the upper and lower portions of the frame feature of the invention.

Referring now to FIGS. 1–3, a container 10 according to the invention is illustrated. As will become clear, the container 10 includes a number of features that specifically address problems that the plastic manufacturing industry has faced in container design and provides other beneficial features. According to one important aspect of the container 10, a lenticular insert 20 is included and attached to an outer wall 12 of the container 10 to provide a number of desirable structural and heat transfer characteristics as well as enhanced visual effects on the container 10. The lenticular insert 20 typically functions to provide an image with 3D features, movement, zoom in and out, and other characteristics. In this regard, the lenticular insert 20 preferably extends substantially around the entire periphery of the wall 12 covering a large portion of the outer wall 12 surface area. To provide enhanced imagery, the lenticular insert 20 includes lenticular lens material and ink which can be thought of as comprising three layers of material, as shown in FIGS. 2 and 3: an outer surface layer of optical ridges 22 with corresponding optical grooves, an interior, transparent layer 24 having numerous lenses forming air channels 26 in the layer 24, and an ink layer 28 printed onto the flat surface of the transparent layer 24. Additionally, bonding and thermal protection layer 30 is bonded to the ink layer 28 to provide a bonding surface with the outer wall 12 of the container 10 and to thermally protect the ink layer 28 during plastic fabrication processes (both functions will be discussed in detail in connection with the container fabrication process).

The extruded lens material of layer 24 and ridges 22 is generally made of PETG, APET, PVC, OFP, or any other plastic that has a good quality refractive index. During fabrication, the lens material (i.e., the flat surface of layer 24) may be pre-coated with a primer to ensure better adhesion of the ink 28 throughout the process of fabricating the container 10 (explained below in connection with FIG. 4). This primary may be water-based, solvent-based, or UV-curable. Excellent ink 28 adhesion is critical, as the ink must hold to the transparent layer 24 for the entire container fabrication process. The pre-coating with a primer may be done via web or sheet fed operations or other suitable application methods.

During fabrication of the lenticular insert 20, the pre-extruded lens material 24 and 22 is then printed on the reverse side or second surface of layer 24 via web or offset press operations to form ink layer 28. The lens layer 24 is printed with corresponding interlaced images in conjunction with the appropriate mathematics of the lens materials 24 and 22. The mathematics preferably not only matches the lens material 24 and 22 but also the distortion caused by the final shape of the piece (i.e., often not a flat surface). In the case of a cup or other conical shaped object, the lens or optical ridges 22 "open up" and create a new mathematical pitch. This pitch is predetermined before plates are made and printing occurs so that the lenticular insert 20 can be viewed in its final form. As a result of this process of accommodating for non-planar surfaces or orientations, the image or images on the lenticular inserts 20 will not appear correctly (i.e., will be distorted) when coming off of the printing equipment in flat sheets or web form.

The use of a relatively large lenticular insert 20 relative to the surface area of the outer wall 12 serves several important purposes. As discussed previously, the manufacturers of plastic containers and cups are continuously searching for container and cup designs that reduce manufacturing costs by reducing material costs. In this regard, the lenticular insert 20 is preferably a substantially rigid sheet of plastic material having an overall thickness of about 8 mils to about 25 mils or more (depending on the materials used and the complexity of the images created) that when inserted into the outer wall 12 of the container 10 acts to provide strength to the container 10. Due, at least in part, to the optic ridges 22, the lenticular insert 20 creates a mechanical support which, when over-molded by the plastic resin of the outer wall 12 as a backing, supports and stiffens the outer wall 12 of the container 10, thereby giving the container 10 increased hoop strength. One benefit of this improved hoop strength is that the material costs of the container 10 can be maintained while obtaining a container 10 with an improved hoop strength. More likely and more preferably, the size of the lenticular insert 20 is large enough that plastic equal or greater than the volume of the lenticular insert 20 can be omitted during fabrication of the outer wall 12 in places where the lenticular insert 20 is positioned because the insert 20 provides more than sufficient strength to account for the omitted wall 12 material. The resulting, lighter (in plastic) container 12 has the same or better hoop strength than a standard container without an insert and with a larger amount of plastic in the outer wall 12. Of course, the desirability of a container 10 with increased hoop strength will be obvious to any consumer who has held a full plastic cup of liquid and been concerned that if they hold it anywhere near the open end that the liquid will be squeezed out of the container 10.

In traditional cups or containers, the side wall of each cup is smooth so that it can be offset print and because any grooves added to provide a consumer a better gripping surface significantly increase the cost of the mold (and make printing on the wall difficult or impossible). By including the lenticular insert 20 on the outer wall 12 with printing already in place on the side wall of a cup, the optical ridges 22 function to enhance the ability of a consumer or user to grip the outer wall 12 of the container 10 by providing a relatively rough gripping surface while eliminating any printing problems associated with rough surfaces because the lenticular insert 20 is "pre-printed." Additionally, the optical grooves help to collect and remove or drain any condensation on the outer surfaces of the cup wall that might make it more difficult for a user of the container 10 to grip the outer surface of the outer wall 12. In this manner, the lenticular insert 20 can be thought of as an inserted or attached gripping surface to the container 10.

The lenticular insert 20 preferably is configured to provide a thermal barrier or layer of lower heat transfer rates compared with a standard plastic container outer wall. This typically includes some air or other gas passages or simple air grooves rather than only solid layers of plastic material. In this regard, a number of lens layouts and configurations may be used (e.g., more irregular than the air channels 26 shown in FIG. 2). As illustrated, a preferred embodiment of the lenticular insert 20 includes the air channels 26 which typically contain air and which create an effective thermal barrier on the outer wall 12 of the container 10. This thermal barrier created by the lenticular insert 20 functions to reduce heat transfer from and to the contents of the container 20, which enhances the container's usefulness for hot and cold service (i.e., holding hot and cold liquids). In a preferred embodiment, about 35% or more of the outer wall 12 surface area is covered by the lenticular insert 20 to provide the thermal barrier.

According to another important feature of the container 10, the container 10 includes a framing system or picture frame of plastic material that functions to physically bond the lenticular insert 20 to the outer wall 12 of the container 10. The frame system further eliminates seams between the mating edges of the lenticular insert 20 and rough mating surfaces or seams between the lenticular insert 20 and the outer wall 12. By providing these functions, the framing system overcomes structural weaknesses that may be present at the seam where the lenticular insert 20 mates when wrapped around the container 10. This strength problem, which can lead to cracking is a significant concern in conical or frustoconical shaped objects such as a typical plastic cup. In general, the framing system comprises an overlap of plastic material over each of the side edges of the lenticular insert 20. As illustrated in FIGS. 1–3, the framing system includes an upper frame member 14 overlapping the upper edge of the lenticular insert 20 on the optical ridges 22 for a depth, $d_U$, and a lower frame member 16 overlapping the lower edge of the lenticular insert 20 on the optical ridges 22 for a depth, $d_L$. As illustrated, a preferred embodiment of the container 10 is configured such that the side edges of the lenticular insert 20 are slightly spaced apart (i.e., for a distance of about ¼ inch or less). This space is filled with a seam frame member 18 that overlaps the lenticular insert 20 on optical ridges 22 for a width, w.

The frame members 14, 16, and 18 can take a number of shapes which are typically defined by the mating surface of the optical ridge 22, and may be, as illustrated, a beveled member with a triangular cross-section. The frame members 14, 16, and 18 preferably are fabricated from the same material as the outer wall 12 and are bonded to the outer wall 12. Typically, this bonding will occur as part of the fabrication process when the frame members 14, 16, and 18 are formed during the same process as the outer wall (e.g., injection of the plastic into a mold cavity) or will occur when the outer wall 12 is formed if the frame members 14, 16, and 18 are performed in a separate process step (i.e., form the frame members 14, 16, and 18 and bond them to the lenticular insert 20 prior to forming the outer wall 12). The amount of the overlap, w, $d_U$, and $d_L$, will depend on a number of factors such as the weight and thickness of the lenticular insert 20 and the strength characteristics of the material used for the frame members 14, 16, and 18. In one embodiment, the overlaps, w, $d_U$, and $d_L$, are the same and are approximately 0.060 inches or less, but it should be understood that these overlaps may differ from each other (e.g., w may be less than or greater than $d_U$, and $d_L$ or vice versa) and may be larger than used in this embodiment.

In other embodiments not illustrated, the potential weakness in the container 10 where the lenticular insert 20 butts together is handled differently. In one alternate embodiment, a bevel is formed on each side edge of the lenticular insert 20. The beveled edges have a shape (e.g., a 45° bevel) to provide good strength characteristics and preferably have an adequate depth to provide an overlapping mating surface that provides increased structural strength. In one embodiment, the depth of the overlap is equal to the thickness of the lenticular insert 20. The beveling can be achieved in a number of ways such as by shaving off part of the material of the lenticular insert 20 on both side edges creating a beveled overlap. In another alternate embodiment, a "zipper" like structure is created at the seam formed between the side edges of the lenticular insert 20. The zipper pattern formed on each side edge of the lenticular insert 20 is positioned and mated together prior to fabrication such as in the mold cavity for the container 10 (or before the part is placed in the mold cavity). Clearly, a large number of other interweaving shapes and mating techniques may be used to practice the invention and obtain the beneficial features of the container 10 (i.e., overcoming the weakness inherent in a butt joint between the side edges of the lenticular insert 20).

As a result of the features discussed above, the container 10 is a durable, one-piece part with excellent graphics with improved physical strength characteristics, a thermal barrier, improved gripping, and reduced plastic material cost and manufacturing time cost. While a cup was shown for the container 10, it should be understood that the shape of the container that may be fabricated to obtain some of the above benefits may vary widely, with one of the key features being the addition of the lenticular insert 20. In this regard, the lenticular insert 20 was illustrated with a specific 3-layer embodiment for clarity of description, but lenticular materials and lens material with myriad configurations are readily available and many, if not all, of the available configurations may be used as the lenticular insert 20. These substitutions are considered within the breadth of the invention and would only require minor changes to the design of the containers 10 (such as a change in the length of overlaps in the framing system and the like). With an understanding of the unique features of an object (i.e., the container 10) that includes a lenticular insert on an outer wall, it now will be useful to fully discuss the method of making containers (and other objects) according to the invention. Significantly, the following method of fabrication provides a unique method of bonding a lenticular insert to molten plastic wherein the ink or ink layer of the lenticular insert is not ruined or altered.

Figure 4:
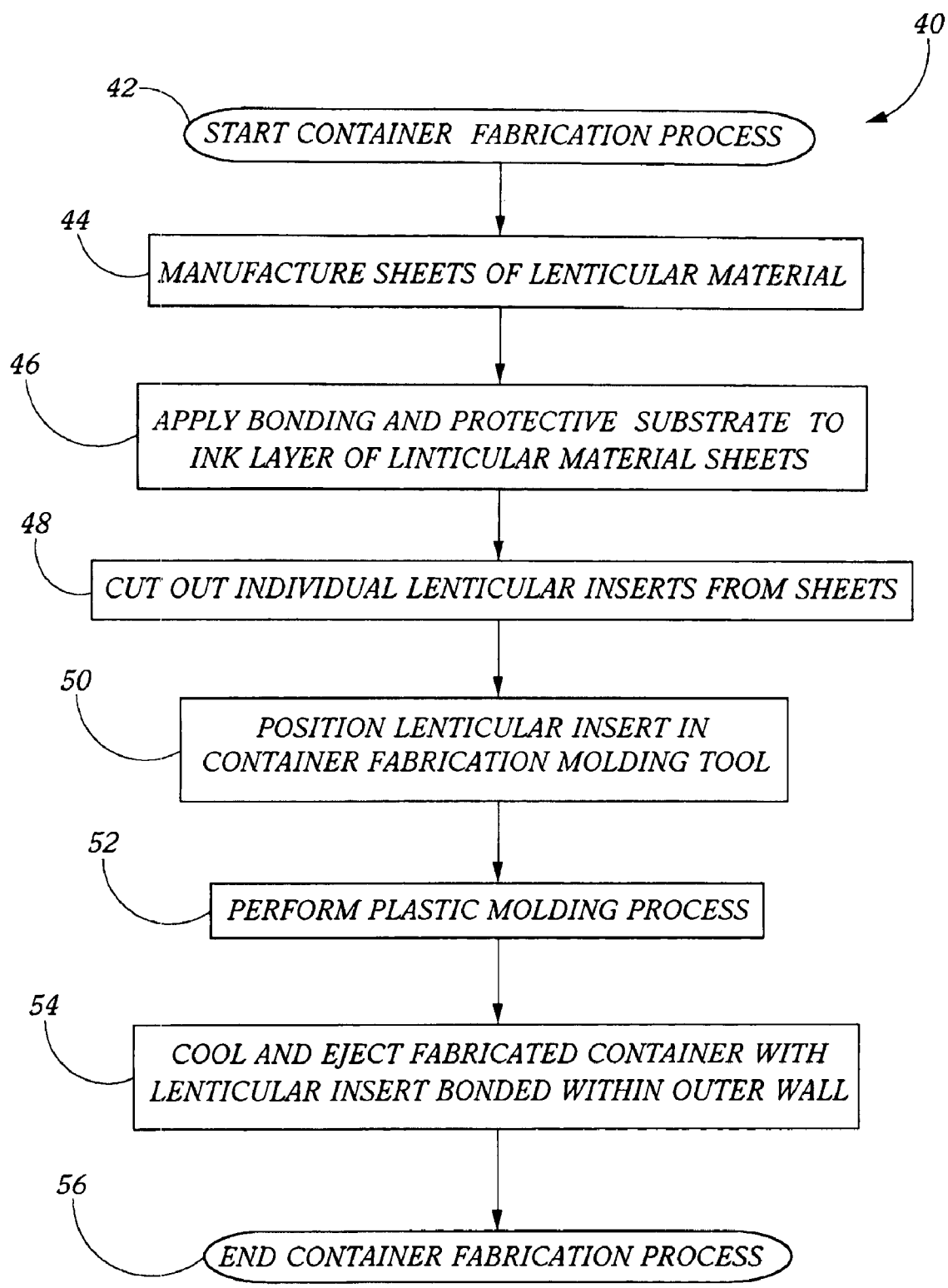
FIG. 4 is a flow chart illustrating the general process steps of a container fabrication method according to the invention.

Referring now to FIG. 4, the general steps and features of a method 40 of fabricating a container (such as container 10 of FIG. 1) is illustrated. The fabrication method 40 starts at 42 with the general planning of the visual imagery to be provided with a lenticular insert and the size, shape, and material of the container upon or within which the lenticular insert will be bonded. For the following example, the fabrication of container 10 of FIG. 1 will be discussed with the bonding of the lenticular insert 20. Once this beginning planning step 42 is completed, the fabrication method 40 continues at 44 with the manufacture of sheets of lenticular material. The physical design and make up of these sheets were discussed above in connection with the configuration of the lenticular insert 20 of the container 10 and can be seen in FIGS. 2 and 3. Typically, the lenticular material sheet will include transparent plastic optical ridges 22, a transparent lens layer 24 or web, and an applied ink or ink layer 28. The actual printing of the lenticular piece may be 3D or animated and the lens format (e.g., the combination of ridges 22 and layer 24) may be vertical or horizontal. In a vertical format, 3D images and movement can be viewed, while with the horizontal format only motion will be viewable. The fabrication of lenticular material sheets as in step 44 is well known by those skilled in the printing arts and does not need to be discussed in depth at this point. lenticular material fabrication is described in U.S. Pat. No. 5,967,032 to Bravenec et al. and U.S. Pat. No. 5,753,344 to Jacobsen which are incorporated herein by reference. Additionally, the method of laying out or arranging inserts (or labels) for a conical container such as container 10 is illustrated in FIG. 1 of U.S. Pat. No. 5,908,590 to Yoshimi et al. which is incorporated herein by reference which is directed to producing labels for foamed resin containers. In this manner, the patterns for a number of lenticular inserts can be arranged on a large sheet of lenticular material that can be further processed within the same processing line or in a separate processing system.

The next step of the container fabrication process 40 is to ensure that lenticular inserts 20 cut from the lenticular material sheet produced in step 44 can bond to the liquid plastic in a mold (i.e., during step 52 of process 40) or other plastic fabrication or processing step. The inventors recognize that here are two significant problems to overcome in using lenticular material as an insert in the plastic fabrication process 40. First, the printing ink used in typical lenticular material sheet manufacturing processing does not have chemistry compatible to bond to the hot (e.g., approximately 500° F.) plastic, such as the plastic used to form the outer wall 12 of the container 10. Second, even if the ink in layer 28 was able to bond to the plastic, the inks used to print layer 28 on the lenticular material sheet are typically not able to hold up to high temperatures experienced in standard molding processes such as injection molding and blow molding and are ruined or substantially degraded.

According to an important aspect of the invention, the container fabrication process 40 includes unique processes that protect the applied ink 28 from the high temperatures and that also provide a bonding surface between the lenticular material in the produced sheet and the molten plastic used to form the outer wall 12 of the container 10. As background, the inventors first believed that one method of providing these protection and bonding features would be to employ the hot melt polyethylene chemistry typically used in the film laminating industry. Consequently, the inventors first attempted to find a way to place a layer of hot melt polyethylene over the ink side 28 of the lens material 22 and 24. Unfortunately, this technique presented problems as the temperature required for flow out of the polyethylene onto the pre-printed lenticular lens material sheet destroyed the ink 28 on the lens material layer 24 or at the very least loosened its bond to the lens material layer 24.

The inventors then identified a preferred solution to providing thermal protection for the ink 28 and providing a bonding surface, which is represented as step 46 of the process 40. According to the inventive step 46, a bonding and protective substrate 30 is applied to the ink layer 28 of the produced lenticular material sheet. In one embodiment, this application process 46 involves first coating in web form in a toll coating operation hot melt poly material to a carrier or throwaway liner (not shown) and then second, applying or bonding the hot melt poly material to the printed lens material (i.e., to ink layer 28) in a separate process or substep. Significantly, this second step can be accomplished at much lower temperatures than with the hot melt flow techniques discussed above. The temperatures required for activation may vary with the materials used for the hot melt poly and the carrier or liner and their thickness but in a preferred embodiment the activation temperature is in the range of 190° to 250° F., and more preferably in the range of about 210° to 225° F. This second step functions to form the bonding and thermal protection substrate 30, as illustrated in FIGS. 2 and 3, which is firmly and substantially permanently bonded to the ink layer 28. Polyester compounds may be used for the carrier or liner may be utilized as the carrier because polyesters easily stand up to the heat in the hot melt coating portion of step 46 (i.e., a prefab substep completed prior to applying the substrate 30) but, of course, other materials may be utilized for the liner. The inventors have found this prefab substep process to be efficient and economical because of the low material costs and because it can be run or completed at high speeds.

Since the hot melt poly is later applied or bonded to the lenticular material sheet (against ink layer 28) in a separate operation, the polyester carrier or liner (not shown) preferably has the characteristics of a quick and non-damaging release liner. In other words, the side of the liner in which the hot melt poly is applied must have a low surface tension so that the hot melt poly does not permanently mate to the polyester or other material of the liner. To attach or bond the hot melt-liner combination, i.e., the laminate, to the lenticular material sheet, the backside of the liner (i.e., the portion away from the lenticular material sheet) is heated as the entire laminate is placed with pressure onto the back side (the printed side 28) of the lenticular lens material sheet.

More specifically, in one embodiment, the carrier or release liner is manufactured from a polyester material that can withstand the heat generated from the web coating process used to coat the polyester liner with the hot melt poly. During the web coating process, the polyester liner is coated with a polyethylene blend at about 400° F., which is a high enough temperature to achieve flow of the resin. Approximately 0.5 to 3 mils of polyethylene is placed on the polyester liner with the thickness accurately measured and controlled. More preferably, the thickness of the hot poly (which becomes the bonding and thermal protection substrate 30) is 2.5 mils to provide an adequate thermal barrier for the ink 28 and a good anchor and bonding surface on the lenticular insert 20. During the lamination process, the polyester of the liner is heater so that the opposite side (i.e., the polyethylene) is heated to the temperature point of becoming semi-liquid and sticky or tacky. The polyethylene typically begins to transform at about 180° F. and the window or range for proper lamination is generally between 190 and 300° F. In one operating mode of the invention, polyethylene (with the polyester liner) is applied to the ink 28 side of the lenticular insert 20 at temperatures between about 220 and 250° F. at application or feed rates of about 100 to 200 feet per minute. As a result of this application process, the laminate and the lenticular material sheet form into one piece. Next, either in line with the process or after sufficient cooling, the throw away liner portion of the laminate is removed from the lenticular material sheet leaving a very accurately measured amount of hot melt material bonded over the ink 28, thereby forming the bonding and thermal protection substrate 30 of the lenticular insert 20.

In order to do this as an in-line process, sufficient cooling may be achieved by placing the laminate and lenticular material sheet over a chill roller for a cooling period before the liner is removed to leave the hot melt 30 intact over the ink 28. In one embodiment of the fabrication method 40, the linear has a silicon treatment (or alternatively, some other type of release chemistry may be used) applied to the side of the liner that mates with the hot melt poly to allow the liner to readily from the hot melt poly 30 and stay attached to the ink 28 in the process. One reason that this process works well is due, at least in part, to the fact that the temperatures required to activate the hot melt poly for bonding to the ink 28 are only around 200° F., whereas to get poly material to flow out in prior art methods of thin film laminating requires much higher temperatures that would be detrimental to the ink used in the lenticular material sheet. The type of equipment used to perform above steps may be a Bellhoffer, D K or any type of thermal laminator with higher speed laminator devices being preferred to reduce manufacturing costs.

Because the substrate application step 46 is a key feature of the method of the invention, it may be helpful to more fully discuss the application of the substrate 30 and to discuss alternative processes that may be used as part of step 46. After the lenticular material sheet is manufactured in step 44 (i.e., pre-coated and printed, yet still in sheet form or roll form), the sheet can be laminated with a variety of substrates to provide the bonding the thermal protection features of the invention. In this regard, the in-mold process (i.e., plastic molding process 52) generally requires that the inks 28 are protected, and according to the invention this is achieved by placing a substrate 30 between the inks 28 and the hot molding material (the molten plastic) used to form the outer wall 12 of the container 10. As previously discussed, this molding material may be polypropylene, styrene, polyethylene (such as HDPE), PVC, or a number of other plastics that are suitable for use in injection and blow molding processes. Consequently, the substrate 30 applied in the above discussed hot melt poly-liner process 46 preferably comprises a material that readily bonds to these plastics such as, but not limited to, polypropylene, polyester, PVC, polycarbonate, and APET.

It is important to the fabrication method of the invention that two things occur: (1) the inks 28 must be protected from the extreme heat of the molten plastic in the molding process 52 so that they are not damaged and (2) the surface of the lenticular insert 20 that abuts the outer wall 12 must be compatible with the injection or other molding process (in other words, the process 40 needs to provide an adequate or very favorable bond to the molten plastic used in the injection or other molding process 52). Therefore, the standard ink used to create ink layer 28 on the back of the lens layer 24 is not suitable for this purpose.

As an alternate to the lamination process for applying the substrate 30 discussed above, the substrate 30 may be applied by other techniques that effectively attach the substrate 30 to the ink 28 while eliminating the liner application and removal steps discussed above. In this alternative step 46, the poly material forming the substrate 30 is applied directly to the back of the lens layer 24 over the ink 28 without the liner or carrier. In this alternative step 46, the poly material of the substrate 30 may be applied in a number of ways including, but not limited to, with the use of a thermal adhesive, a hot melt adhesive, or a pressure sensitive adhesive. In addition, there may be other liquid chemistry adhesives in the urethane and epoxy areas that may in some embodiments be useful with the invention. Further, the substrate 20 may instead be another material that achieves the bonding and thermal protection goals while allowing for an alternate application step 46. For example, coatings may be used for the substrate 30 to accomplish the same goal in the molding process as the poly laminates. While generally more difficult to use, coatings can provide the functions of protecting the ink 28 while providing a surface that provides for bonding the piece during the injection or other molding process 52. The following coatings may be useful as the substrate 30: UV curable, solvent-based, electron beam (E-beam) curable, and water-based coatings. The thickness of these coatings needed to thermally protect the ink 28 and, in some applications, to bond to the outer wall 12 material in the holding processed will vary with each material, but generally, a coating substrate 30 has a thickness between 0.5 and 2.0 mils. Any of these coatings may be applied to the part or sheet with a variety of methods and equipment such as: roller coating equipment, blanket coating equipment (such as on a press), screen equipment, and spray equipment.

Referring again to FIG. 4, the fabrication process 40 continues at 48 wherein the lenticular inserts 20 are cut or otherwise removed from lenticular material sheets now having the bonding and thermal protection substrate 30 attached and with or without the liner. At 48, the lenticular material sheet is further processed and/or cut to form lenticular inserts 20 with the desired shape for the in-mold process step 52. Typically, step 48 is completed with a quillotine cutter for square and rectangular pieces and a die cutter for other shapes such as the lenticular insert 20 illustrated. After the lenticular insert 20 is die cut or otherwise formed, the throw away liner (if attached to the substrate 30) is removed so that the hot melt poly material of substrate 30 is exposed. Alternatively, the liner may be removed in an in-line application in the process 40 prior to step 48.

Figure 5:
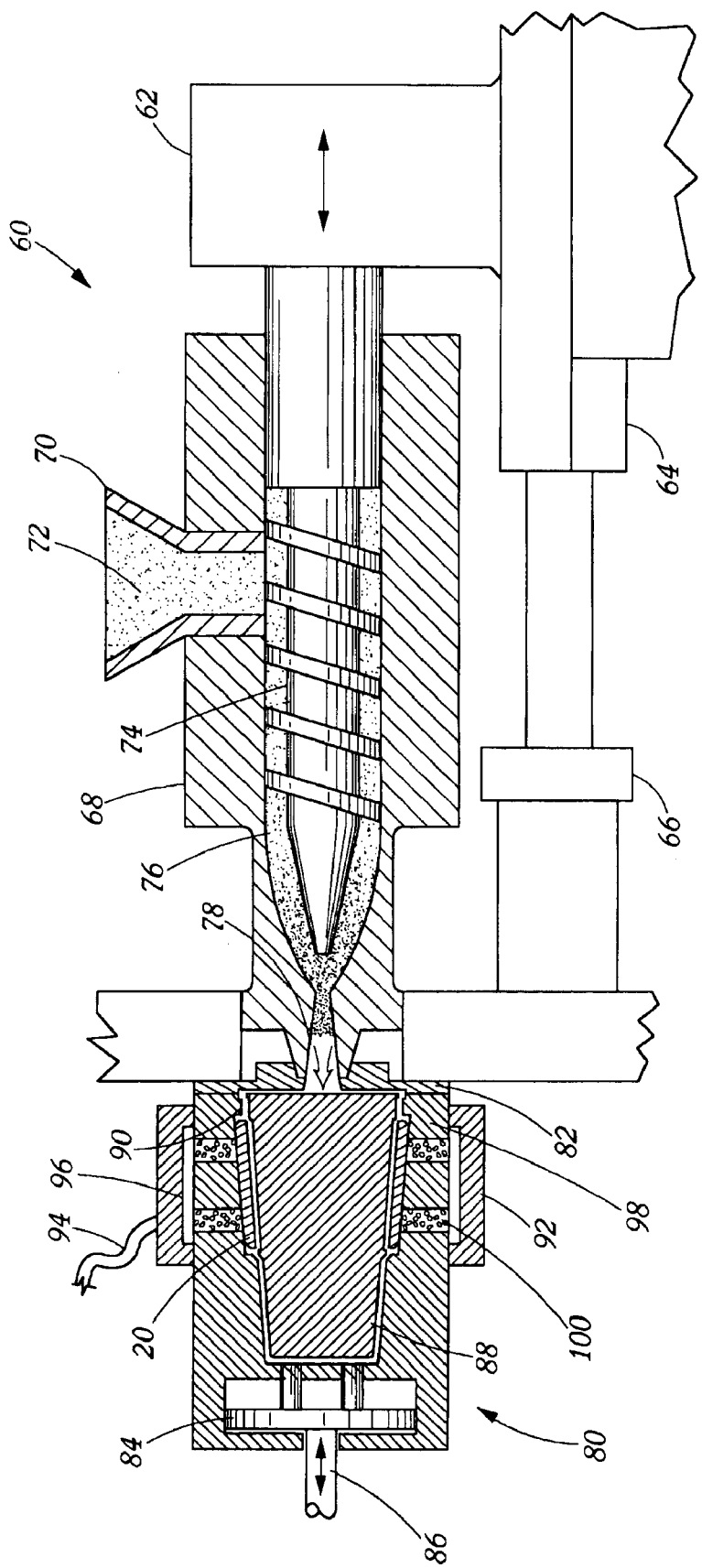
FIG. 5 is a sectional view of an injection molding assembly according to the present invention with the lenticular insert positioned with a developed vacuum against the outer walls of the mold cavity prior to injection of liquid plastic into the mold.

With reference to FIGS. 4 and 5, the lenticular insert 20 is then placed via hand or robotics into a mold cavity 90 of a mold 80 portion of a molding tool 60 (an injection molding assembly is illustrated but other molding devices, such as a blow molding assembly, may be used). The mold cavity 90 of the molding tool 60 is specifically configured to accommodate the lenticular insert 20. The lenticular insert 20 is placed in the mold cavity 90 so that the hot melt poly side or substrate 30 of the lenticular insert 20 is exposed to the molten plastic in the mold cavity 90 during step 52.

At 52, the container 10 is molded. In one embodiment, the molding step 52 is completed by plastic injection molding processes. Referring to FIG. 5, an injection molding tool 60 is illustrated that is configured for molding containers 10 with a lenticular insert 20. As illustrated, the injection molding tool 60 in a single-stage reciprocating screw type which tends to thoroughly prepare material for injection and often are faster, but, clearly, other injection molding tools may be utilized such as a conventional single-stage plunger type or a two-stage plunger or screw-plasticisor type. During operation the raw plastic (i.e., the material charge of thermoplastic material) 72 is fed into the material hopper 70 where it contacts the injector screw 74. As the screw 74 is turned by the screw drive motor 62, the screw 74 is pushed backward (to the right in FIG. 5) and the material charge 72 is forced into the chamber 76 of the heating cylinder 68. When enough material 72 to fill the mold cavity 90 has been prepared (i.e., heated to between 300 and 700° F. depending on the type of plastic), the screw drive motor 62 is shut off to stop turning the screw 74. The pull-in cylinder 66 is operated to move the screw 74 on the slide 64 to ram the material charge 72 through the inlet nozzle 78 into the mold cavity 90 of the mold 80.

The plastic liquid resin 72 is injected into the mold cavity 90 defined by the passages between and within the mold top 82, the mold body 84, and the center die 88. The plastic 72 is injected under high heat and pressure (5000 to 50,000 psi) and contacts the exposed portions of the lenticular insert 20. The hot melt poly material of the substrate 30, when exposed to the liquid plastic 72 (at around 500° F. but may be varied depending on the polymer used for the liquid plastic or material charge 72), is activated substantially immediately and at least the outer portion of the substrate 30 exposed to the liquid plastic 72 becomes a liquid. The exposed and heated portion of the substrate 30 remains a liquid for a very brief time and then re-solidifies in the mold as the entire container 10 cools in step 54. This process creates an almost instant and substantially permanent bond at the interface 32 between the lenticular insert 20 and outer wall 12 of the container 10. The thin layer of hot melt poly of substrate 30 bonded to the lenticular insert 20 acts to thermally insulate the ink 28 protect the ink from the heat and physically protect the ink 28 from the pressure of the process, thereby leaving the ink 28 intact. The thickness of the substrate 30 can vary significantly with the type of material used but is preferably minimized to control costs and allow the insert 20 to be an integral part of the outer wall 12, and in one embodiment, the substrate thickness is maintained in the range of 1 to 3 mils.

In some applications, there are small changes in the mathematics of the lenticular insert 20 that may occur in the process due to the heat and pressure of the process and need to be compensated or planned for in the initial printing and fabrication processed of steps 42 and 44. Additionally, the framing system discussed previously is created in this molding step 52, and the lenticular insert 20 is formed to leave flow paths for the molten plastic to form frame members 14, 16, and 18 (seam frame member 18 being formed due to a gap or flow path between the side edges of the lenticular insert 20 that is formed when the lenticular insert 20 is placed within the mold cavity 90 and the vacuum is applied, as discussed below).

At 54, the injected material in the mold 80 is allowed to cool within mold 80 until it has hardened adequately. At this point, the hardened and formed container 20 with an integrally bonded lenticular insert 20 is ejected by the ejector 86 positioned in the mold body 84, and the container fabrication process 40 is ended at 56 (with removal of flash and the undesired top portion of the container 10 resulting from the inlet flow passages of the mold 80).

According to a significant feature of the fabrication process 40, the outer surfaces (i.e., the optical ridges 22 are forcefully positioned in abutting contact with the outer walls of the mold cavity 90. This is important because the failure to do so results in molten plastic material 72 making its way to the front of the lenticular insert 20 and "bleeding" onto the optical ridges 22, thereby preventing a portion of the image from being seen and creating undesirably ragged plastic seams and framing. In order to prevent seeping of molten plastic 72, the following position retention processes, among other retention techniques, may be employed as part of the plastic molding step 52.

In the embodiment illustrated in FIG. 5, the molding tool 60 is configured so that it holds the lenticular insert 20 tightly to the wall of the mold cavity 90 by the development and application of a vacuum. In this manner, the molten plastic 72 is blocked from flowing into the optical ridges 22 and is limited to flow paths that form the shape and outer wall 12 of the container 10. This may be done by configuring the molding tool to develop a vacuum at the outside walls of the tool to pull the lenticular insert 20 firmly against the outer walls of the mold cavity 90 prior to beginning the injection of molten plastic. Of course, the vacuum developed must be strong enough to overcome any forces and pressures that are placed on the lenticular part during the injection process. As illustrated in FIG. 5, the vacuum is created in a vacuum chamber 96 that encircles the mold 80 and is formed within the vacuum housing 92 which is attached to the mold body 84. A vacuum hose 94 is in communication with the vacuum chamber 96 to provide the necessary suction to establish (and also to release) the vacuum. The vacuum or suction forces are applied to the lenticular insert 20 through vacuum passages 98 and 100 which are in fluid communication with the vacuum chamber 96 and the lenticular insert 20. While any number and location of vacuum passages may be used, in one embodiment, two vacuum passages 98, 100 that are circular to contact the lenticular insert 20 at substantially its entire circumference and at the two ends of the lenticular insert 20 are utilized. A number of designs may be used for the vacuum passages 98, 100 such as a fully or partially open air flow channel in the mold body 84. In the preferred embodiment illustrated, a porous plastic material is utilized to provide a controlled flow of air while also minimizing any flow of resin plastic 72 that may potentially begin to enter the vacuum passages 98, 100.

In a second preferred embodiment (not illustrated), a position retention method provides a solution to the plastic seeping problem through the added step of applying buttons, projected slots, or other raised surfaces to the substrate 30 side of the lenticular insert 20 prior to insertion into the mold cavity 90. When the lenticular insert 20 having the buttons or raised surfaces is positioned within the mold cavity 90 and the center die 88 is positioned, the buttons or raised surfaces abuttingly contact the center die 88 and are pushed outward toward the outer walls of the mold cavity 90, thereby forcing the optical ridges 22 against the mold cavity 90 walls and cutting off any seepage flow paths.

The buttons or lots preferably are arranged symmetrically around the lenticular insert 20 and in conical shaped objects, such as cups and the container 10, are primarily needed at the portion of the lenticular insert 20 nearer the inlet nozzle 78 where the liquid plastic 72 is inserted and pressure is greater. The thickness of these buttons or slots preferably is selected to be approximately, if not exactly, the same as the object thickness in some applications or as illustrated the outer wall 12 thickness (less the thickness of the lenticular sheet or other insert). The projecting buttons or slots are typically made of a plastic material that is compatible with the material used in the injection molded process. In many cases, it is preferable to use material identical to the material used in the molded object.

The small buttons or slots are attached to the lenticular insert 20 prior to insertion into the mold 80. They may be applied in a variety of ways, from hand application to an automated, self-feeding machine. The buttons or slots may be applied using pressure sensitive glue, or any appropriate adhesive. In addition to using pre-made buttons or slots, the desired raised or spacer surfaces may be formed with any type of hot or liquid (may be an epoxy) material placed on the lenticular insert 20 (as a part of the initial fabrication in step 44 or after the cut out step 48). This would allow a droplet of molten plastic or some type of polymer with enough body to remain three dimensional and not flow out onto the part. The droplet of liquid or molten plastic could cure or dry partially while remaining pliable and soft enough to be deformed or flattened in the process with a calendaring roller which flattens the raised surface to the exact height needed for the molding process 52 (about or exactly the thickness of the wall 12 of the container or other molded object).

In this embodiment of the position retention process, the secondary parts (or buttons) can be applied quickly and economically and in a very automated process. In raised surface attachment process, the lenticular material sheet or the lenticular inserts 20 would be moving on a conveyor system and dots, slots, or buttons of liquid material would be applied. A few feet down the conveyor, the sheets or inserts 20 would run under a roller in which the liquid dots, slots, or buttons would be calendared or flattened to the desired level or thickness accurately prior to the dots, slots, or buttons curing or drying (forming) completely. Calendaring processes are quite accurate and maintain the thickness necessary to provide the lenticular material sheet or lenticular insert 20 along with the dots, slots, or buttons that allows the sheet or part to be held in place against the outside of the mold cavity 90, thereby preventing undesired filling of the molten or liquid plastic 72 on the front side or visual side (i.e., on the optical ridges 22) of the lenticular insert 20 by holding the lenticular insert 20 tightly under pressure to the mold cavity 90 walls.

Those skilled in the plastic fabrication arts will understand that the invention method 40 may be practiced with other plastic molding techniques and the invention is not limited to injection molding for step 52. For example, molding step 52 may be achieved with blow molding techniques. In this mode of operation (not illustrated), a heated length of thermoplastic material shaped as a tube (called a parison) is placed on an air nozzle between the halves of an open mold (although the parison may be extruded within the cavity on some molding machines). The lenticular insert 20 is inserted within the cavities of the mold and the mold is closed to pinch shut the open end of the parison opposite the air nozzle. Air is then blown into the parison to force the parison to expand such that the still hot thermoplastic material contacts the substrate 30 of the lenticular insert 20 forming a bond at interface 32 between the outer wall 12 of the container 10.

Of course, blow molding is more appropriate for hollow plastic objects such as squeeze bottles and the like rather than for objects shaped like container 10. In this regard, it should be noted in the above discussion of a process according to the invention a container was fabricated for simplicity of illustration and discussion and because of the particular effectiveness of the inventive method in forming such cups with lenticular inserts. However, the inventive fabrication method is similarly useful in fabricating any plastic object having a lenticular insert bonded to a surface. The important features of the inventive method are that the ink of the lenticular material is protected and that a unique bonding surface is provided between the lenticular material and the molten plastic.

Obviously, a complete list of the large number of plastic items that cannot be provided herein, but the following is a representative sampling of the type of plastic objects that can be fabricated with the fabrication method of the invention: containers of shapes and sizes, credit, debit, and money cards, telephone cards, prepared purchasing cards, identification cards, video and audio medium containers, toys, watches, book and literature covers, trading cards, decorations, and the like.

The foregoing description is considered as illustrative only of the principles of the invention. Furthermore, since numerous modifications and changes will readily occur to those skilled in the art, it is not desired to limit the invention to the exact construction and process shown and described above. For example, although the container 10 was fabricated such that the lenticular insert 20 was held to the outer wall 12 with a framing system and by bonding between substrate 30 and the outer wall 12 at interface 32, many applications can be imagined wherein only one of these features of the invention would be used to hold or bond the lenticular insert 20 to the container or other plastic object. Consequently, the use of only one of these techniques to produce a plastic object with a lenticular insert is within the disclosure and breadth of the invention.

Additionally, according to the method of the invention, the ink of the lenticular insert is protected from extreme heat, and this thermal protection would also be provided to other heat sensitive devices that could be laminated within the lenticular insert 20 (such as between the lens layer 24 and the substrate 30). These devices may be useful for further enhancing the images provided with the lenticular insert 20 and may be used to provide movement, changes in color, provide light, and even interactivity. Such included devices may include flat batteries to power included intelligence, sound chips, lighting pipes or other lighting devices, and other miniature electronic devices. Additionally, it is often desirable to add coding or numbering to a collector's cup or object to control counterfeiting, and the above fabrication process may readily include steps that number or otherwise identify the fabricated object (e.g., by adding a number to the ink layer of the lenticular insert 20) to make the object unique and more desirable as a collectable. Similarly, this coding or numbering can be used to encode a sweepstakes context number or security number (i.e., variable data) on the ink layer 28 which is not exposed. The ink layer 28 is protected from damage or tampering once the container or object is formed by the plastic of the container or object and by the lens layers 22, 24, thereby, controlling counterfeiting and copying to increase security and retaining the high quality image of the lenticular insert 20 for a longer period (i.e., increasing the service life of the lenticular insert 20 as wear from normal use, such as placing a container in a dishwasher, does not occur on the protected ink layer 28). Further, intermediary steps of the fabrication process 40 may in some cases be eliminated while still practicing the disclosed invention.

Accordingly, resort may be made to all suitable modifications and equivalents that fall within the scope of the invention as defined by the claims when follow. The words "comprise," "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

What is claimed is:

1. A product for displaying lenticular images, comprising: an insert including a lenticular lens material having a first outer surface of optical ridges and corresponding optical grooves, and a second side opposite the first outer surface; a transparent interior layer having a first side opposite the first outer surface of the lenticular lens material; a layer of ink attached to the second side of the transparent layer, the ink layer further having a side opposite the second side of the transparent layer; and a thermal protective substrate layer separated from the lenticular lens material by the ink layer, the thermal substrate layer being attached to and covers the side of the ink layer opposite the second side of the transparent layer; and a plastic base, wherein the thermal protective substrate layer is thermally fused to the plastic base, and the first outer surface of the lenticular lens material faces away from the base.

2. The product of claim 1, wherein the substrate layer thermally fused to the plastic base is free of a separate adhesive layer.

3. The product of claim 1, wherein the thermal protective substrate layer comprises a material selected from a group consisting of polypropylene, polyester, polyvinylchloride, polycarbonate, amorphous polyethylene terephthalate, ultraviolet-curable coatings, solvent-based coatings, electron-beam-curable coatings, and water-based coatings.

4. The product of claim 1, wherein the thermal protective substrate layer has a thickness selected from the range of 0.5 to 3.0 mils.

5. The product of claim 1, wherein the product is a container of material and is constructed of a material other than the insert material, the container having an outer wall, and at least a portion of the plastic base is the outer wall of the container.

6. The product of claim 5, wherein the insert has two side edges and two ends, the edges extend along substantially the entire perimeter of the outer wall of the container such that two ends of the insert form a seam.

7. The product of claim 1, wherein the plastic base includes an integrally molded frame member.

8. A plastic product for displaying lenticular images, comprising: an insert including a lenticular lens material having a first outer surface of optical ridges and corresponding optical grooves, and a second side opposite the first outer surface; a transparent interior layer having a first side opposite the first outer surface of the lenticular lens material; a layer of ink attached to the second side of the transparent layer, the ink layer further having a side opposite the second side of the transparent layer; and a thermal protective substrate layer separated from the lenticular lens material, which thermal protective substrate layer is attached to and covers the ink layer; and a plastic base attached to the insert by thermal fusion between the thermal protective substrate layer and the plastic base.

9. A plastic product of displaying lenticular images, comprising: an insert including a lenticular lens material having a first outer surface of optical ridges and corresponding optical grooves, and a second side opposite the first outer surface; a transparent interior layer having a first side opposite the first outer surface of the lenticular lens material; a layer of ink attached to the second side of the transparent layer, a thermal protective substrate layer separated from the lenticular lens material and attached to the ink layer opposite the second side of the transparent layer; and having thermal fusion between the thermal protective substrate layer and a plastic base, wherein the first outer surface provides a hand gripable surface.

10. In combination, a plastic material and an insert in abutting fused contact, the insert including a lenticular lens material having a first outer surface of optical ridges and corresponding optical grooves, and a second side opposite the first outer surface, a transparent interior layer having a first side opposite the first outer surface of the lenticular lens material, a layer of ink attached to the second side of the transparent layer, the ink layer further having a side opposite the second side of the transparent layer; and a thermal protective substrate layer separated from the lenticular lens material and which thermal protective substrate is attached to and covers the ink layer, wherein the first outer surface provides a gripable surface.

11. The product of claim 1, wherein the plastic base comprises a non-planar surface against which the insert is fused.

12. The product of claim 1, wherein the plastic base comprises a planar surface against which the insert is fused.

13. A plastic cup having a gripable exterior displaying lenticular images, comprising an insert including a lenticular lens material having a first outer surface of optical ridges and corresponding optical grooves, and a second side opposite the first outer surface, a transparent interior layer having a first side opposite the first outer surface of the lenticular lens material; a layer of ink attached to the second side of the transparent layer, the ink layer further having a side opposite the second side of the transparent layer; and a thermal protective substrate layer separated from the lenticular lens material, and which thermal protective substrate layer is attached to and covers the side of the ink layer opposite the second side of the transparent layer; a cup bottom; a generally cylindrical plastic cup side wall, attached to the cup bottom, wherein the first outer surface of the lenticular material of the insert faces away from the cup side wall to form the gripable exterior of the cup; and thermal fusion between the thermal protective substrate layer of insert and the plastic cup side wall.

14. The plastic cup of claim 13, wherein the thermal protective substrate layer comprises a material selected from the group consisting of polypropylene, polyester, polyvinyl chloride, polycarbonate, amorphous polyethylene terephthalate, an ultraviolet-curable coating, a solvent-based coating, an electron-beat-curable coatings, and a water-based coating.

15. The plastic cup of claim 13, wherein the thermal protective substrate layer has a thickness selected from the range of 0.5 to 3.0 mils.

16. The plastic cup of claim 13, wherein the insert covers substantially the entire exterior circumference of the plastic cup side wall.

17. The plastic cup of claim 13, wherein the thermal fusion is a mixture of part of the thermal protective substrate layer and part of the material of the plastic cup side wall.

18. The plastic cup of claim 13, wherein the insert has a generally cylindrical or frustoconcial shape which insert shape matches the shape of the plastic cup side wall.

19. The product of claim 1, wherein the first outer surface of the lenticular lens material provides a hard gripable surface.

20. The plastic product of claim 8, wherein the first outer surface of the lenticular lens material provides a hand gripable surface.

21. The plastic cup of claim 16, wherein the insert covers substantially the entire exterior of the plastic cup side wall.

22. The plastic cup of claim 16, wherein the insert covers a portion of the exterior of the plastic cup side wall.

23. The product of claim 1, wherein a portion of the plastic base surrounds a portion of the insert.

24. The product of claim 1, wherein the thermally fused material between the thermal protective substrate layer and the adjacent plastic base is a melt mixture of a portion of the thermal protective substrate layer and a portion of the adjacent plastic base.

25. The product of claim 1, wherein the product is a cup having a hoop strength greater than the product without a thermally fused insert.

26. The product of claim 1, wherein ink layer is an lenticulated image.

27. The product of claim 1, wherein ink layer is an ultraviolet cured coating.

28. The plastic product of claim 27, wherein the ultraviolet cured coating includes a polymer.

29. The plastic product of claim 27, wherein the ultraviolet cured coating includes a pigment.

30. The product of claim 1, wherein the thermal protective substrate layer is an ultraviolet cured coating.

31. The plastic product of claim 30, wherein the ultraviolet cured coating is an ink.

32. The product of claim 1, further including a primer layer between the lenticular lens material and the ink layer, a primer layer between the ink layer and the thermal protective substrate layer, or both.

33. The product of claim 32, wherein the primer layer is a water-based coating, solvent-based coating, or an ultraviolet-curable coating.

34. An article comprising: a lenticular insert comprising: a lenticular lens sheet having a first surface having optical ridges and grooves and a second surface opposite the first surface; a transparent interior layer having a first side opposite the first outer surface of the lenticular lens material; a layer of ink on the second surface of the transparent layer; and a thermal protective substrate layer coated on the layer of ink, the thermal protective substrate layer being separated from the lenticular lens material by the layer of ink; and a plastic base, wherein the optical ridges and grooves of the first surface of the lenticular lens sheet face away from the plastic base and are hand gripable, the thermal protective substrate layer being thermally fused to the plastic base, and the fused region between the substrate layer and the plastic base being a melt mixture of the substrate layer and the plastic base and which region is free of a separate adhesive layer.

35. A product for displaying lenticular images, comprising:
    an insert including a lenticular lens material having a first outer surface of optical ridges and corresponding optical grooves; a transparent interior layer having a first side opposite the first outer surface of the lenticular lens material; an image layer of ink attached to the second side of the transparent layer, the image layer further having a side opposite the second side of the transparent layer; and a thermal protective substrate layer which is attached to and covers the side of the image layer opposite the second side of the transparent layer; and a plastic base fused to the thermal protective substrate layer, wherein the first outer surface faces away from the plastic base.

36. The product of claim 35, wherein the transparent interior layer includes air channels.

37. The product of claim 35, wherein the first outer surface of the lenticular lens material provides a hand gripable surface.

* * * * *

UNITED STATES PATENT AND TRADEMARK OFFICE
CERTIFICATE OF CORRECTION

PATENT NO.      : 7,153,555 B2
APPLICATION NO. : 09/566063
DATED           : December 26, 2006
INVENTOR(S)     : Raymond et al.

It is certified that error appears in the above-identified patent and that said Letters Patent is hereby corrected as shown below:

Column 1, Line 37:
There should be no new paragraph after "lids.".

Column 1, Line 60:
Delete "desired" and insert --desire--.

Column 2, Line 52:
Delete "products," and insert --product,--.

Column 3, Line 12:
Delete "includes" and insert --include--.

Column 3, Line 39:
Delete "avoids," and insert --voids,--.

Column 3, Lines 44 and 46:
Delete "terephthalate" and insert --terephthlate--.

Column 5, Line 7:
Delete "pressure" and insert --pressures--.

Column 7, Line 31:
Delete "primary" and insert --primer--.

Column 10, Line 46:
Delete "lenticular" and insert --Lenticular--.

Column 11, Lines 14-15:
"background," should be hyphenated.

Column 11, Line 43:
Delete "225°" and insert --250°--.

Column 12, Line 15:
Delete "heater" and insert --heated--.

Column 12, Line 20:
Delete "190" and insert --190°--.

Column 12, Line 23:
Delete "220" and insert --220°--.

UNITED STATES PATENT AND TRADEMARK OFFICE
CERTIFICATE OF CORRECTION

PATENT NO. : 7,153,555 B2
APPLICATION NO. : 09/566063
DATED : December 26, 2006
INVENTOR(S) : Raymond et al.

It is certified that error appears in the above-identified patent and that said Letters Patent is hereby corrected as shown below:

Column 12, Line 38:
Delete "linear" and insert --liner--.

Column 12, Line 41:
After "readily" insert --release--.

Column 13, Line 44:
Delete "holding processed" and insert --molding process--.

Column 13, Line 58:
Delete "quillotine" and insert --guillotine--.

Column 14, Line 26:
Delete "300" and insert --300°--.

Column 14, Line 50:
After "28" insert --,--.

Column 14, Line 62:
Delete "processed" and insert --process--.

Column 15, Line 48:
After "ends" insert --or edges--.

Column 16, Line 1:
Delete "lots" and insert --slots--.

Column 16, Line 22:
After "hot" delete "or".

Column 17, Line 20:
Delete "type" and insert --types--.

Column 17, Line 61:
Delete "context" and insert --contest--.

Column 18, Line 9:
Delete "when" and insert --which--.

UNITED STATES PATENT AND TRADEMARK OFFICE
CERTIFICATE OF CORRECTION

PATENT NO. : 7,153,555 B2
APPLICATION NO. : 09/566063
DATED : December 26, 2006
INVENTOR(S) : Raymond et al.

It is certified that error appears in the above-identified patent and that said Letters Patent is hereby corrected as shown below:

Column 18, Line 10:
Delete the second occurrence of "comprise," and insert --comprises,--.

Column 18, Line 40:
Delete "polyvinylchloride," and insert --polyvinyl chloride,--.

Column 18, Line 41:
Delete "terephthalate," and insert --terephthlate,--.

Column 19, Line 36:
After "surface" delete "," and insert --;--.

Column 19, Line 48:
After "of" insert --the--.

Column 19, Line 53:
Delete "terephthalate," and insert --terephthlate,--.

Column 19, Line 54:
Delete "beat" and insert --beam--.
Delete "coatings," and insert --coating,--.

Signed and Sealed this

Eleventh Day of November, 2008

JON W. DUDAS
*Director of the United States Patent and Trademark Office*